Aug. 24, 1965  L. RINGDAL  3,202,745
METHOD AND APPARATUS FOR SINTER MOLDING OF PLASTIC ARTICLES
Filed Oct. 10, 1961  2 Sheets-Sheet 1
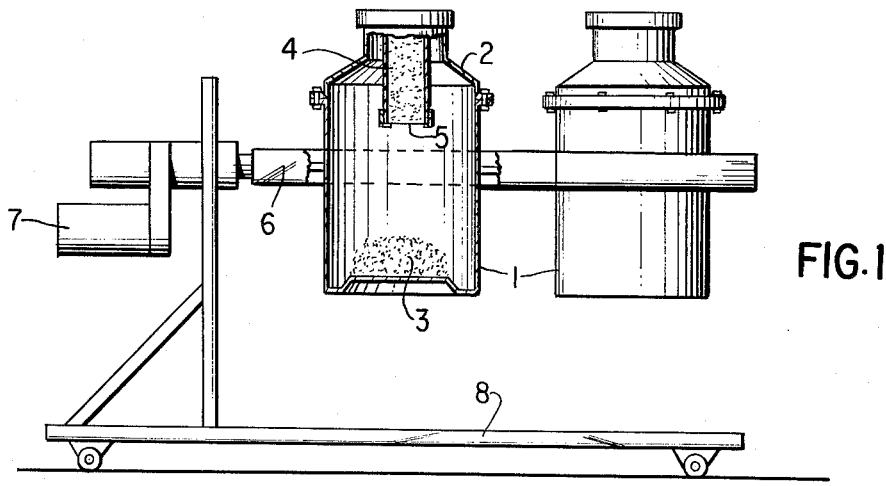
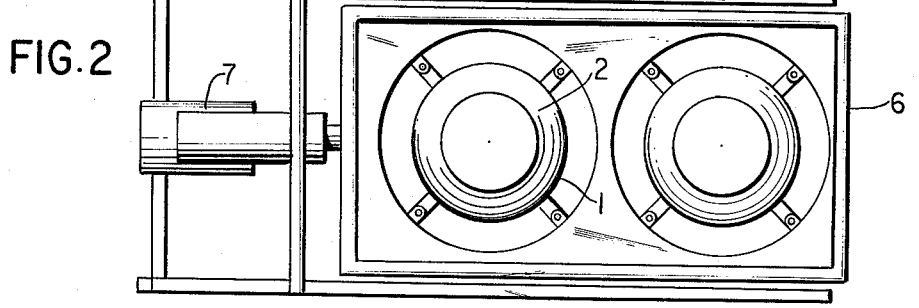
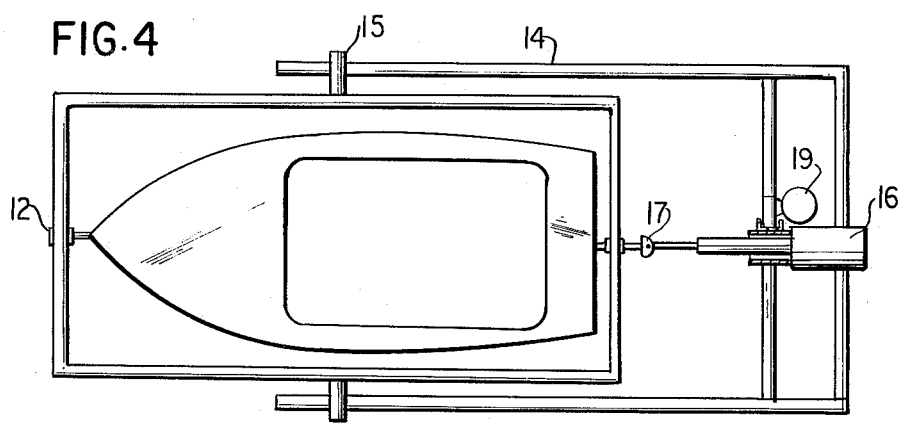
INVENTOR
LARS RINGDAL
BY Albert C. Johnston
ATTORNEY Aug. 24, 1965  L. RINGDAL  3,202,745
METHOD AND APPARATUS FOR SINTER MOLDING OF PLASTIC ARTICLES
Filed Oct. 10, 1961  2 Sheets-Sheet 2

INVENTOR
LARS RINGDAL
BY Albert C. Johnston
ATTORNEY

United States Patent Office 3,202,745
Patented Aug. 24, 1965

3,202,745
METHOD AND APPARATUS FOR SINTER
MOLDING OF PLASTICS ARTICLES
Lars Ringdal, Oslo, Norway, assignor to Vasco Industries
Corp., New York, N.Y., a corporation of New York
Filed Oct. 10, 1961, Ser. No. 144,171
11 Claims. (Cl. 264—113)

Various methods of sinter molding plastics articles are known, in which through heating of the mold walls a layer of molten plastics is built up which is subsequently through cooling detached from the mold walls and may be removed from the mold.

The present invention has for its object, through the sinter molding of finely divided thermoplastic materials, such as powdered polyethylene, to be able to produce articles, the outer and inner walls of which have different color, or as frequently is desired to be able to produce articles from material of two different qualities. One may, for example, consider an article as a milk pail. It is here desired that the pail shall let pass as little light as possible and therefore should be produced from a material of a dark color. On the other hand, in order to be able to control the cleaning it is desired that the inner surfaces of the walls are white. It is further desired that the pail shall have a mechanical strength as great as possible and the outer wall of dark color should therefore be produced from a material giving the greatest possible mechanical strength and tensional strength. The latter materials are, however, more difficult to melt through the sinter molding process and therefore do not give the smooth and porefree surface necessary for obtaining effective cleaning.

According to the invention the problems above mentioned are solved thereby that in a manner known per se a layer of material of one quality is first formed in the mold through sintering, and subsequently a new charge of finely divided or pulverized plastics material is introduced into the mold for producing a further layer, which forms the other side of the article.

An apparatus for carrying out the above method comprises a container which is mounted in association with the mold and which contains plastics powder of a different color and/or quality than the powder which already exists in the mold and which container is adapted to open or to be opened during the molding process and drop a portion of powder into the mold at a time when the powder present in the mold is melted to a layer on the mold wall.

The invention is described in the following with reference to the drawing which purely diagrammatically illustrates the method and apparatus for carrying out the method.

In the drawings:

FIGS. 1 and 2 are a side view and a top view respectively of mold and illustrate quite generally an apparatus according to the invention.

FIGS. 3 and 4 are a side view and a top view respectively of an embodiment of an apparatus according to the invention.

Figure 3:
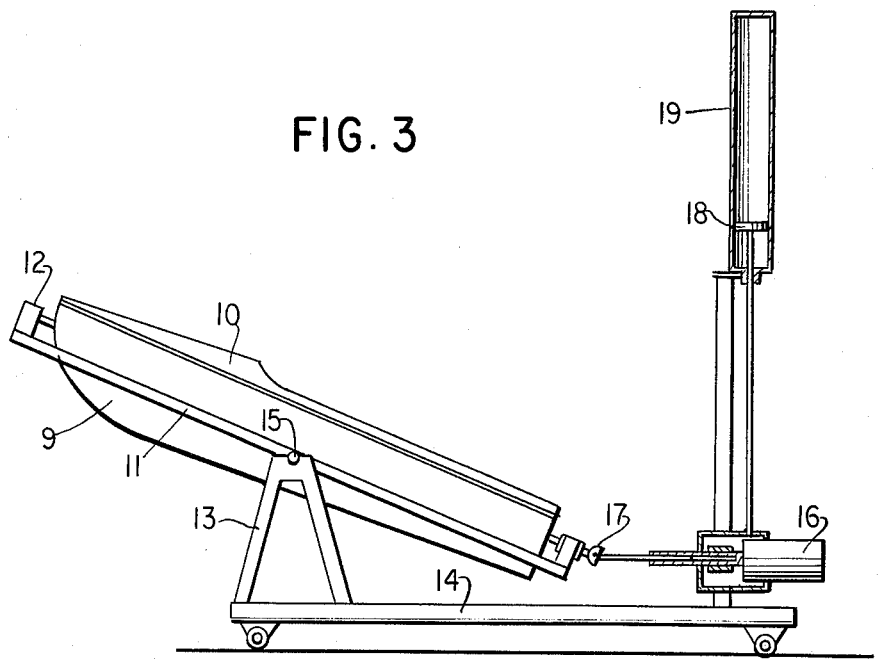

In FIGS. 1 and 2, 1 denotes the mold proper and 2 the upper detachable part for removing the finished product. The finely divided plastics material introduced into the mold for forming the outer wall of the article is designated 3. 4 denotes a container which is provided in association with the mold and which contains a plastics material of a different color and/or quality than the material 3. The container 4 has in the embodiment shown a closure for its downwardly directed opening, consisting of a diaphragm or the like 5 of a material which melts at a predetermined temperature in the mold. As a result hereof the container 4 will open and drop its contents of powder into the mold.

6 designates a frame in which the mold may be rotatably supported and 7 designates a drive for moving or turning the frame 6 and/or the mold 1. The frame 6 together with the mold 1 is mounted in a carriage or a stand 8.

In FIGS. 3 and 4, 9 designates a mold having a detachable upper part 10. The mold 9 is mounted on the frame 11 and is turnable about an axis indicated at 12. The frame 11 is rockably or tiltably supported in a bearing stand 13 on the carriage 14. The pivot shaft of the frame 11 is designated 15. The carriage 14 is provided with a drive 16 which through a joint 17 is operatively connected with the mold for rotating the latter. The drive 16 may, while the mold rotates, be raised and lowered by means of a piston 18 in a hydraulic cylinder 19.

Figure 5:
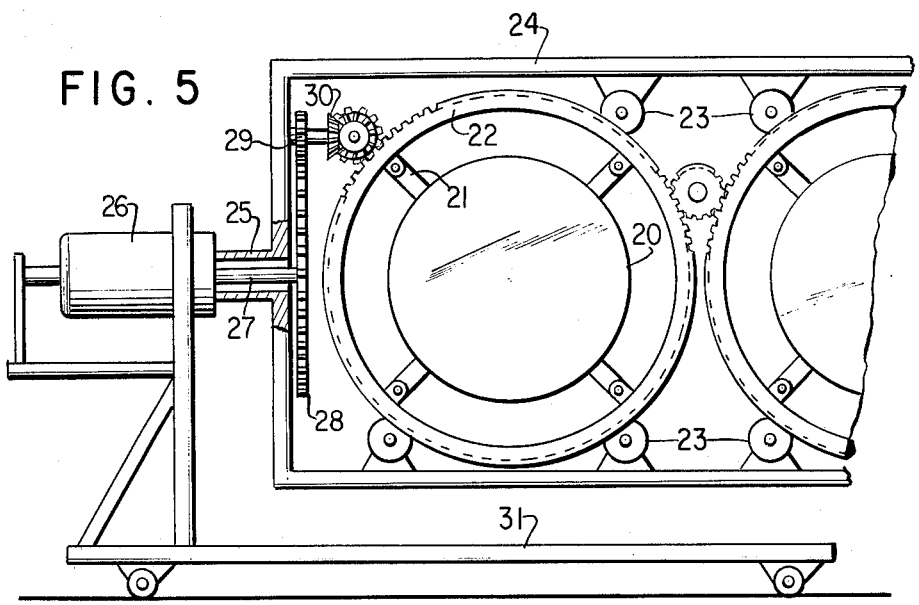
FIG. 5 illustrates a further embodiment.

In FIG. 5 the mold is designated 20. The mold 20 is by means of the clamping members 21 clamped in a ring 22. This ring has externally a gear and is carried by rollers and driven by the gears 23 which are mounted in stands or the like rigidly connected with an outer supporting frame 24. This supporting frame 24 is formed with a hollow shaft 25 which is connected with a drive 26 for turning the frame 24. Through the hollow shaft 25 is passed a shaft 27 having a gear 28 which is operatively connected with a gear 29. This gear 29 carries a pivot pin with bevel gear 30 from which the drive via a sprocket wheel and a chain is transmitted to the ring 22 for rotating the latter. The whole arrangement is carried by the carriage 31.

For carrying out the method by means of the apparatus shown and described, one proceeds in that way that the sinter molding mold is filled with the required quantity of raw material of the quality and color which it is desired to use in the outer layer or wall of the article. Thus in association with the mold a container is provided for the raw material which it is desired to use on the one side of the article. The sinter molding process can now begin, and when the plastics material which is freely present in the mold is melted to a layer on the mold walls, the inner container will open and drop its contents into the mold without interruption of the sintering process. The opening of the inner container may as indicated in FIG. 1 take place automatically, for example thereby that said container is closed by a meltable diaphragm as above explained. Or the opening of the inner container may also take place by means of an automatic device which opens the container after a predetermined time, or the like.

For the carrying out of the method certain means are required, which may be adapted to keep the mold or molds in a two-way unrhythmical rotational motion, or impart to the mold or the molds a rotational and at the same time unrhythmical slow rocking motion so that the plastics powder during the sintering process is evenly distributed on all the mold walls.

The device above described may also be used for carrying out the method of producing articles which are intended to consist of a plastics material of one and the same color and quality. The method is then carried out in such a way that the sinter molding molds are placed in the oven without plastics powder. When then the walls of the mold have been evenly heated, the inner container is opened as above described and drops the plastics powder loosely into the molds while the latter make the also above described unrhythmical two-way motion. As a result thereof the plastics powder is distributed to an even layer on the now correctly heated mold walls. By dropping the plastics powder into a preheated mold which is in a two-way motion, the greatest possible evenness of the wall thickness is obtained, and there is less danger of air pockets being formed in the casting. A further advantage is that for the sinter molding process a plastics may be used which only can stand a rather short heating and melting period. Also a greater freedom as regards the construction of the molds is obtained, because the heat is distributed more evenly to all the walls of the mold regardless of the material thickness when the heating takes place before any plastics powder is present in the molds.

What is claimed is:

1. The method of producing a shaped hollow article, which comprises
   placing a charge of a finely divided thermoplastic material in a hollow mold the inner surface of which has the external configuration of the article to be produced,
   by rotating and heating said mold distributing particles of said material over and heating them from said mold surface until the particles of said charge are fused together into a continuous first layer covering said surface,
   then, while continuing the rotation and the heating of said mold, distributing the particles of a second charge of a different finely divided thermoplastic material over and heating them from the inner surface of said first layer until they are fused together and to said layer into a continuous second layer covering the inside of and integrated with said first layer.

2. The method of producing a shaped hollow article, which comprises
   placing a first charge of finely divided thermoplastic material in a hollow mold the inner surface of which has the external configuration of the article to be produced,
   confining a second charge of finely divided thermoplastic material to a zone fixed relative to and openable to the inside of said mold but disposed away from said surface,
   by rotating and heating said mold distributing the particles of said first charge over and heating them from said mold surface until they are fused together into a coherent first layer covering said surface,
   then opening said zone into the mold and delivering said second charge from said zone into the mold and, by continuing the rotation and the heating of said mold,
   distributing the particles of said second charge over and heating them from the inner surface of said first layer until they are fused together and to said layer into a continuous second layer integrated with said first layer.

3. A method according to claim 2, said second charge being confined to said zone by a fusible partition exposed to the heat within said mold, and melting said partition to release said second charge for delivery into the mold.

4. The method of producing a shaped hollow article, which comprises
   placing a charge of a first polyethylene powder in a hollow mold the inner surface of which has the external configuration of the article to be produced,
   confining a charge of a different polyethylene powder to a zone fixed relative to and openable to the inside of said mold but disposed away from said surface,
   by rotating said mold and heating it externally distributing said first powder over and heating it from said mold surface until its particles are fused together into a continuous first layer covering said surface,
   then, while continuing the rotation and the heating of said mold,
   opening said zone into the mold and distributing said charge of said different polyethylene powder over and heating its particles from the inner surface of said first layer until its particles are fused together and to said layer into a continuous second layer integrated with the inside of said first layer,
   and then cooling the resulting article and removing it from the mold.

5. A method according to claim 4, said first powder having a higher melting point and greater mechanical strength than said different powder.

6. In an apparatus for fusion molding of thermoplastic particles, a mold, means for rotating said mold while the mold is subjected to heat, for the distribution and fusion in said mold of a first charge of thermoplastic particles placed therein, and means carried by said mold for depositing a second charge of thermoplastic particles into said mold at a predetermined time for fusion with the fused first charge in said mold.

7. Apparatus for molding a hollow article, comprising
   a hollow mold adapted to be heated externally, the inner surface of which has the external configuration of the article to be produced,
   means for moving said mold so as to distribute thermoplastic particles loose therein over said surface for fusion thereon, and
   means carried by said mold for confining a charge of thermoplastic particles to a zone away from said surface, said confining means including means whereby the same is opened to deliver said charge loose into said mold after a period of heating of said mold.

8. Apparatus according to claim 7, said means whereby said confining means is opened comprising a partition which melts at a predetermined temperature and is disposed within said mold.

9. Apparatus according to claim 7, including a supporting stand, a frame mounted on said stand for movement about one axis, means carried by said frame for holding said mold, said holding means being movable relative to said frame to move said mold about an axis at an angle to said one axis, and means for driving said frame and said mold holding means simultaneously.

10. An apparatus according to claim 9, said frame and said mold holding means being rotatable about said axes, said one axis being horizontal.

11. An apparatus according to claim 9, said frame being mounted for rocking movement about a horizontal axis, said driving means including a vertically movable mechanism mounted on said stand and connected with said frame for rocking said frame and means carried with said mechanism for rotating said mold holding means in said frame.

References Cited by the Examiner

UNITED STATES PATENTS

| | | | |
|---|---|---|---|
| 760,193 | 5/04 | Gaylord | 161—182 |
| 1,879,676 | 9/32 | Fulcher | 161—182 |
| 2,428,434 | 10/47 | Rubissow | 18—26 XR |
| 2,465,819 | 3/49 | Rubissow | 18—58.3 XR |
| 2,495,483 | 1/50 | Rubissow | 18—26 X |
| 2,542,757 | 2/51 | Dubin | 18—26 |
| 2,736,925 | 3/56 | Heisler et al. | 204—310 |
| 2,839,788 | 1/56 | Dembiak | 264—310 |
| 2,870,054 | 1/59 | Amos et al. | 264—114 |
| 2,936,505 | 5/60 | Witucki | 18—58.3 X |
| 2,967,329 | 1/61 | Friedland et al. | 264—310 |

FOREIGN PATENTS 585,395   2/47   Great Britain.

ALEXANDER H. BRODMERKEL, *Primary Examiner.*
MICHAEL V. BRINDISI, *Examiner.*